US006949139B2

(12) United States Patent
Molaire et al.

(10) Patent No.: US 6,949,139 B2
(45) Date of Patent: *Sep. 27, 2005

(54) PROCESS FOR FORMING COCRYSTALS CONTAINING CHLORINE-FREE TITANYL PHTHALOCYANINES AND LOW CONCENTRATION OF TITANYL FLUOROPHTHALOCYANINE USING ORGANIC MILLING AID

(75) Inventors: Michel F. Molaire, Rochester, NY (US); Louis J. Sorriero, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/655,289

(22) Filed: Sep. 4, 2003

(65) Prior Publication Data

US 2004/0106055 A1 Jun. 3, 2004

Related U.S. Application Data

(60) Provisional application No. 60/430,777, filed on Dec. 4, 2002.

(51) Int. Cl.[7] .............................................. C09B 67/50
(52) U.S. Cl. ...................... 106/412; 106/410; 106/411; 106/413; 540/122; 540/140; 540/141
(58) Field of Search ................ 106/410, 411, 106/412, 413; 540/122, 140, 141

(56) References Cited

U.S. PATENT DOCUMENTS

| | | | |
|---|---|---|---|
| 3,589,924 A | 6/1971 | Giambalvo et al. ..... | 106/288 Q |
| 4,555,467 A | 11/1985 | Hasegawa et al. .......... | 430/110 |
| 4,701,396 A | 10/1987 | Hung et al. .................... | 430/58 |
| 4,785,999 A | 11/1988 | Takijiri ........................ | 241/26 |
| 4,882,427 A | 11/1989 | Enokida et al. ............. | 540/141 |
| 4,994,566 A | 2/1991 | Mimura et al. ............. | 540/141 |
| 5,008,173 A | 4/1991 | Mimura et al. ................ | 430/78 |
| 5,039,586 A | 8/1991 | Itami et al. .................... | 430/78 |
| 5,055,368 A | 10/1991 | Nguyen et al. ................ | 430/78 |
| 5,059,355 A | 10/1991 | Ono et al. .................... | 252/584 |
| 5,112,711 A | 5/1992 | Nguyen et al. ................ | 430/58 |
| 5,132,197 A | 7/1992 | Iuchi et al. .................... | 430/76 |
| 5,166,339 A | 11/1992 | Duff et al. ................... | 540/141 |
| 5,194,354 A | 3/1993 | Takai et al. .................... | 430/58 |
| 5,206,359 A | 4/1993 | Mayo et al. ................. | 540/141 |
| 5,238,764 A | 8/1993 | Molaire et al. ................ | 430/58 |
| 5,238,766 A | 8/1993 | Molaire et al. ................ | 430/78 |
| 5,523,189 A | 6/1996 | Molaire ........................ | 430/58 |
| 5,614,342 A | 3/1997 | Molaire et al. ................ | 430/78 |
| 5,629,418 A | 5/1997 | Molaire et al. ............. | 540/141 |
| 5,766,810 A | 6/1998 | Molaire et al. ................ | 430/78 |
| 5,773,181 A | 6/1998 | Molaire et al. ................ | 430/78 |
| 2004/0106052 A1 * | 6/2004 | Molaire ...................... | 430/59.5 |
| 2004/0106053 A1 * | 6/2004 | Molaire et al. ............. | 430/59.5 |
| 2004/0110075 A1 * | 6/2004 | Molaire et al. ................ | 430/78 |

FOREIGN PATENT DOCUMENTS

| | | |
|---|---|---|
| EP | 000460615 A1 * | 12/1991 |
| EP | 000807857 A1 * | 11/1997 |

* cited by examiner

*Primary Examiner*—Anthony J. Green
(74) *Attorney, Agent, or Firm*—Lawrence P. Kessler; Paul A. Leipold

(57) ABSTRACT

In a process for forming an amorphous pigment mixture consisting essentially of TiOPc and TiOFPc and containing more than about 75 weight percent of TiOPc, a mixture of crude crystalline TiOPc and TiOFPc pigments in a weight ratio of at least 75:25 TiOPc:TiOFPc is combined with at least about 5 wt. %, based on the total weight of TiOPc and TiOFPc, of an organic milling aid. The mixture is treated under conditions effective to form a substantially amorphous pigment mixture of TiOPc and TiOFPc. The organic milling aid can be separated from the substantially amorphous pigment mixture, which can be converted to a nanoparticulate cocrystalline TiOPc/TiOFPc composition.

27 Claims, 4 Drawing Sheets

PROCESS FOR FORMING COCRYSTALS CONTAINING CHLORINE-FREE TITANYL PHTHALOCYANINES AND LOW CONCENTRATION OF TITANYL FLUOROPHTHALOCYANINE USING ORGANIC MILLING AID

CROSS-REFERENCE TO RELATED APPLICATIONS

In accordance with 37 CFR §1.78(5), this application claims the benefit of provisional application Ser. No. 60/430,777, filed Dec. 4, 2002 in the names of Molaire et al., entitled PROCESS FOR FORMING COCRYSTALS CONTAINING CHLORINE-FREE TITANYL PHTHALOCYANINES AND LOW CONCENTRATION OF TITANYL FLUOROPHTHALOCYANINE USING ORGANIC MILLING AID.

Reference is made to the following co-pending, commonly-assigned applications, the disclosures of which are incorporated herein by reference:

U.S. application Ser. No. 10/655,528, filed Sep. 4, 2003 in the names of Molaire et al., entitled SELF-DISPERSING TITANYL PHTHALOCYANINE PIGMENT COMPOSITIONS AND ELECTROPHOTOGRAPHIC CHARGE GENERATING LAYER CONTAINING SAME;

U.S. application Ser. No. 10/653,573, filed Sep. 2, 2003 in the name of Molaire, entitled UNIFORM COCRYSTALS OF TITANYL FLUOROPHTHALOCYANINE AND TITANYL PHTHALOCYANINE FORMED IN TRICHLOROETHANE, AND CHARGE GENERATING LAYER CONTAINING SAME;

U.S. application Ser. No. 10/655,113, filed Sep. 4, 2003 in the names of Molaire et al., entitled COCRYSTALS CONTAINING HIGH-CHLORINE TITANYL PHTHALOCYANINE AND LOW CONCENTRATION OF TITANYL FLUOROPHTHALOCYANINE, AND ELECTROPHOTOGRAPHIC ELEMENT CONTAINING SAME;

U.S. application Ser. No. 10/655,388, filed Sep. 4, 2003 in the names of Molaire et al., entitled TWO-STAGE MILLING PROCESS FOR PREPARING COCRYSTALS OF TITANYL FLUOROPHTHALOCYANINE AND TITANYL PHTHALOCYANINE, AND ELECTROPHOTOGRAPHIC ELEMENT CONTAINING SAME.

FIELD OF THE INVENTION

The present invention relates to electrophotographic elements and related materials. More particularly, the invention relates to a process for amorphizing highly crystalline mixtures of titanyl tetrafluorophthalocyanine (TiOFPc) and substantially chlorine-free titanyl phthalocyanine (TiOPc) in the presence of an organic milling aid, and converting the amorphous mixtures to nanoparticulate cocrystalline compositions.

BACKGROUND OF THE INVENTION

In electrophotography, an image including a pattern of electrostatic potential, also referred to as an electrostatic latent image, is formed on a surface of an electrophotographic element including at least two layers: a photoconductive layer and an electrically conductive substrate. The electrostatic latent image can be formed by a variety of means, for example, by imagewise radiation-induced discharge of a uniform potential previously formed on the surface. Typically, the electrostatic latent image is then developed into a toner image by contacting the latent image with an electrographic developer. If desired, the latent image can be transferred to another surface before development.

Among the many different kinds of photoconductive materials that have been employed in electrophotographic elements are phthalocyanine pigments such as titanyl phthalocyanine and titanyl tetrafluorophthalocyanines. Electrophotographic recording elements containing such pigments as charge-generation materials are useful in electrophotographic laser beam printers because of their capability for providing good photosensitivity in the near infrared region of the electromagnetic spectrum, that is, in the range of 700–900 nm.

Flocculation of organic pigment dispersions has been a recognized problem, especially in the paint and coating industry, for some time. For example, U.S. Pat. No. 3,589,924 in the names of Giambalvo, et al., describes improved non-crystallizing, non-flocculating phthalocyanine pigment compositions formed by mixing 60–95% of a crystallization-or flocculation-susceptible phthalocyanine pigment with about 5–40% of a sulfonated phthalimidomethyl phthalocyanine derivative. The mixture is prepared by the usual methods, e.g., acid pasting or salt grinding, for converting the phthalocyanine materials to pigmentary size. However techniques that are designed primarily to provide suitable pigments for paints and industrial coatings may not yield materials of sufficient purity or the appropriate crystallinity characteristics to meet the stringent requirements of electrophotographic applications, where high purity is very important for ensuring reliable performance. The crystalline form of the final pigment also has a profound influence on the performance of an electrophotographic element containing it.

In a photoconductive layer produced from a liquid coating composition that includes the titanyl phthalocyanine pigment and a solvent solution of polymeric binder, it is necessary that the titanyl phthalocyanine pigment be in a highly photoconductive form, either crystalline or amorphous, and in a sufficiently stable dispersion to permit its application as a very thin layer having high electrophotographic speed in the near infrared region.

A variety of methods have been used to produce suitable forms of titanyl phthalocyanine having differing crystallographic characteristics. U.S. Pat. No. 5,166,339 in the names of Duff, et al., presents a table of polymorphs of unsubstituted titanyl phthalocyanine in which materials bearing multiple designations are grouped as four types. Many phthalocyanine pigments are discussed in P. M. Borsenberger and D. S. Weiss, *Organic Photoreceptors for Imaging Systems*, Marcel Dekker, Inc., New York, pp. 338–391.

In one type of preparation, commonly referred to as "acid-pasting", crude titanyl phthalocyanine is dissolved in an acid solution, which is then diluted with a non-solvent to precipitate the titanyl phthalocyanine product. In another type of procedure, the crude titanyl phthalocyanine is milled, generally with particular milling media. Additionally, some preparations include a combination of techniques or modify a previously prepared titanyl phthalocyanine.

U.S. Pat. No. 5,132,197 in the names of Iuchi, et al., teaches a method in which titanyl phthalocyanine is acid pasted, treated with methanol, and milled with ether, monoterpene hydrocarbon, or liquid paraffin to produce a titanyl phthalocyanine having main peaks of the Bragg angle 2Θ with respect to X-rays of Cu Kα at 9.0°, 14.2°, 23.9°, and 27.1° (all +/−0.2°).

U.S. Pat. No. 5,206,359 in the names of Mayo, et al., teaches a process in which titanyl phthalocyanine produced by acid pasting is converted to type IV titanyl phthalocyanine from Type X by treatment with halobenzene.

U.S. Pat. No. 5,059,355 in the names of Ono, et al., teaches a process in which titanyl phthalocyanine is shaken with glass beads, producing an amorphous material having no substantial peaks detectable by X-ray diffraction. The amorphous material is stirred, with heating, in water and ortho-dichlorobenzene; methanol is added after cooling. A crystalline material having a distinct peak at 27.3° is produced.

U.S. Pat. No. 4,882,427 in the names of Enokida, et al., teaches a material having noncrystalline titanyl phthalocyanine and pseudo-non-crystalline titanyl phthalocyanine. The pseudo-noncrystalline material can be prepared by acid pasting or acid slurrying. The noncrystalline titanyl phthalocyanine can be prepared by acid pasting or acid slurrying followed by dry or wet milling, or by mechanical milling for a long time without chemical treatment.

U.S. Pat. No. 5,194,354 in the names of Takai, et al., teaches that amorphous titanyl phthalocyanine prepared by dry pulverization or acid pasting can be converted, by stirring in methanol, to a low crystalline titanyl phthalocyanine having strong peaks of the Bragg angle 2Θ with respect to X-rays of Cu Kα at 7.2°, 14.2°, 24.0°, and 27.2° (all +/−0.2°). It is stated that the low crystalline material can be treated with various organic solvents to produce crystalline materials: methyl cellosolve or ethylene glycol for material having strong peaks at 7.4°, 10.9°, and 17.9°; propylene glycol, 1,3-butanediol, or glycerine for material having strong peaks at 7.6°, 9.7°, 12.7°, 16.2°, and 26.4°; and aqueous mannitol solution for material having strong peaks at 8.5° and 10.2° (all peaks +/−0.2°).

U.S. Pat. Nos. 4,994,566 and 5,008,173 both in the names of Mimura, et al., teach a process in which non-crystalline particles produced by acid pasting or slurrying, followed by mechanical grinding or sublimation, are treated with tetrahydrofuran to produce a titanyl phthalocyanine having infrared absorption peaks at 1332, 1074, 962, and 783 $cm^{-1}$.

U.S. Pat. No. 5,039,586 in the name of Itami, teaches acid pasting, followed by milling in aromatic or haloaromatic solvent, with or without additional water or other solvents such as alcohols or ethers, at 20–100° C. In an example, crude titanyl phthalocyanine is milled with α-chloronaphthalene or ortho-dichlorobenzene as milling medium, followed by washing with acetone and methanol. The titanyl phthalocyanine produced has a first maximum intensity peak of the Bragg angle 2Θ with respect to X-rays of Cu Kα at a wavelength of 1.541 Å at 27.3°+/−0.2°, and a second maximum intensity peak at 6.8°+/−0.2°. This was contrasted with another titanyl phthalocyanine that is similarly milled, but not acid pasted. This material has a maximum peak at 27.3°+/−0.2° and a second maximum intensity peak at 7.5°+/−0.2°.

U.S. Pat. No. 5,055,368, in the names of Nguyen, et al., teaches a "salt-milling" procedure in which crude titanyl phthalocyanine is milled, first under moderate shearing conditions with milling media including inorganic salt and non-conducting particles. The milling is then continued at higher shear and temperatures up to 50° C., until the pigment undergoes a perceptible color change. Solvent is substantially absent during the milling steps.

U.S. Pat. No. 4,701,396 in the names of Hung, et al., teaches near infrared sensitive photoconductive elements made from fluorine-substituted titanylphthalocyanine pigments. While phthalocyanines having only fluorine substituents, and those being equal in number on each aromatic ring, are the preferred pigments of the invention described in that patent, various non-uniformly substituted phthalocyanines are taught.

U.S. Pat. No. 5,112,711 in the names of Nguyen, et al., teaches an electrophotographic element having a physical mixture of titanyl phthalocyanine crystals and titanyl fluorophthalocyanine crystals. The element provides a synergistic increase in photosensitivity in comparison to an expected additive combination of titanyl phthalocyanine and titanyl fluorophthalocyanine. Similar elements having physical mixtures combining titanyl phthalocyanine and chloro- or bromo-substituted titanyl phthalocyanine crystals produce results in which the photosensitivity is close to that of the least sensitive of the two phthalocyanines used.

U.S. Pat. Nos. 5,238,764 and 5,238,766, both in the names of Molaire, et al., teach that titanyl fluorophthalocyanine products of acid-pasting and salt-milling procedures, unlike unsubstituted titanyl phthalocyanine, suffer a significant reduction in near infrared sensitivity when they are dispersed in a solvent such as methanol or tetrahydrofuran, which has a $gamma_c$ hydrogen bonding parameter value greater than 9.0. These patents further teach that this reduction in sensitivity can be prevented by first contacting the titanyl fluorophthalocyanine with a material having a $gamma_c$ hydrogen bonding parameter of less than 8.0.

Molaire, et al., in U.S. Pat. No. 5,629,418, discloses a method for preparing titanyl fluorophthalocyanine that includes the steps of: dissolving titanyl fluorophthalocyanine in acid to form a solution; admixing the solution and water to precipitate out amorphous titanyl fluorophthalocyanine; washing the amorphous titanyl fluorophthalocyanine until substantially all of the acid is removed and contacting it with an organic solvent, which results in the conversion of the amorphous material to high crystallinity titanyl fluorophthalocyanine, the amorphous titanyl fluorophthalocyanine having been maintained in contact with water continuously from its precipitation to its conversion to a crystalline form.

The particle size distribution and stability of charge generation dispersions are very important for providing uniform charge generation layer in order to control generation of "breakdown spots" and minimize the granularity of prints. In U.S. Pat. Nos. 5,614,342 and 5,766,810, both in the names of Molaire and Kaeding, is disclosed a method for preparing cocrystals of titanyl fluorophthalocyanine and unsubstituted titanyl phthalocyanine that includes the steps of: admixing crude titanyl phthalocyanine and crude titanyl fluorophthalocyanine to provide an amorphous pigment mixture, as determined by X-ray crystallography using X-radiation characteristic of Cu Kα at a wavelength of 1.541 Å of the Bragg angle 2Θ; contacting the amorphous pigment mixture with an organic solvent having a $gamma_c$ hydrogen bonding parameter of less than 8:0; and, prior to contacting, substantially excluding the amorphous pigment mixture from contact with an organic solvent having a $gamma_c$ hydrogen bonding parameter greater than 9.0. The amorphization step must be substantially complete so as to break the large primary particles of the starting crude pigments and thereby lower the average particle size of the final cocrystalline mixture. Substantially complete amorphization of the crude pigments is also necessary to prevent degradation of the dark decay characteristics of the final cocrystal; small amounts of crude pigments having inherently high dark decay that are not amorphized would not be affected by the subsequent solvent treatment and therefore would retain their high dark decay characteristics, causing degradation of the dark decay property of the final cocrystalline product.

Molaire, et al., in U.S. Pat. No. 5,523,189, discloses an electrophotographic element including a charge generation layer that includes a binder in which is dispersed a physical mixture of a high speed titanyl fluorophthalocyanine having a first intensity peak with respect to X-rays characteristic of Cu Kα at a wavelength of 1.541 Å of the Bragg angle 2Θ at 27°±0.2°, and a second intensity peak at 7.3°±0.2°, the second peak having an intensity relative to the first peak of less than 60 percent; and a low speed titanyl fluorophthalocyanine having a first intensity peak with respect to X-rays characteristic of Cu Kα at a wavelength of 1.541 Å of the Bragg angle 2Θ at 6.7°±0.2°, and a second intensity peak at 23°±0.2°, the second peak having an intensity relative to the first peak of less than 50 percent.

Molaire, et al., in U.S. Pat. No. 5,773,181, discloses a method for preparing a phthalocyanine composition including the steps of: synthesizing a crystalline product including a mixture of five different unsubstituted or fluorosubstituted phthalocyanines, wherein a central M moiety bonded to the four inner nitrogen atoms of the phthalocyanine nuclei represents a pair of hydrogen atoms or a covalent or coordinate bonded moiety, including an atom selected from the group consisting of Li, Na, K, Be, Mg, Ca, Ba, Sc, Y, La, Ac, Ti, Zr, Hf, V, Nb, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, and Sb, with M preferably representing Ti=O; increasing the amorphous character of the mixture of phthalocyanines as determined by X-ray crystallography using X-radiation characteristic of Cu Kα at a wavelength of 1.541 Å of the Bragg angle 2Θ to provide an amorphous pigment mixture; contacting the amorphous pigment mixture with organic solvent having a $gamma_c$ hydrogen bonding parameter of less than 8.0; and prior to the contacting, substantially excluding the amorphous pigment mixture from contact with organic solvent having a $gamma_c$ hydrogen bonding parameter greater than 9.0.

The procedures for the preparation of titanyl phthalocyanine pigments described in the foregoing patents, all of whose disclosures are incorporated herein by reference, suffer from various deficiencies and disadvantages. For example, the use of acid presents a shortcoming for both environmental and safety concerns, particularly in commercial scale procedures. Also, salt milling avoids the use of acid but requires extensive washing of the milled material to remove salts, which can otherwise cause high dark decay in a photoconductor.

Procedures that first contact the titanyl fluorophthalocyanine with a solvent such as methanol or tetrahydrofuran that has a $gamma_c$ hydrogen bonding parameter value greater than 9.0 cause a significant reduction in near infrared sensitivity. The preparation of titanyl fluorophthalocyanine having good photogeneration characteristics is expensive. It would be desirable to be able to produce a crystalline titanyl phthalocyanine composition that has good photogeneration characteristics when used in an electrophotographic element but is less expensive than titanyl fluorophthalocyanine. A suitable procedure would avoid deleterious contact with high $gamma_c$ hydrogen bonding parameter solvents and also not require the use of acid or of salt milling media.

SUMMARY OF THE INVENTION

There is a need to provide a process of amorphizing mixtures of highly crystalline TiOFPc-TiOPc mixtures containing a high concentration of TiOPc, i.e., mixtures containing less than about 25 wt. %, preferably less than about 15 wt. % TiOFPc. It has been found that the inclusion of an organic milling aid in the mixture facilitates the conversion of the crystalline mixture to an amorphous state.

The present invention is directed to a process for forming an amorphous pigment mixture consisting essentially of TiOPc and TiOFPc and containing more than about 75 weight percent of TiOPc, which is preferably substantially chlorine-free. The process includes: combining a mixture of crude crystalline TiOPc and TiOFPc pigments in a weight ratio of at least 75:25 TiOPc:TiOFPc with at least about 5 wt. %, based on the total weight of TiOPc and TiOFPc, of an organic milling aid, treating the mixture under conditions effective to form a substantially amorphous pigment mixture of TiOPc and TiOFPc containing at least about 75 weight percent TiOPc. The substantially amorphous pigment mixture can optionally be separated from the organic milling aid.

Further in accordance with the present invention, a nanoparticulate cocrystalline composition is obtained by forming a slurry in an organic solvent of the substantially amorphous mixture of TiOPc and TiOFPc, and wet milling the slurry to form a nanoparticulate cocrystalline composition that consists essentially of TiOPc and TiOFPc and contains at least about 75 weight percent of TiOPc, which is preferably substantially chlorine-free.

BRIEF DESCRIPTION OF THE DRAWINGS

FIG. 1 shows Comparative Example 1;

FIG. 2 shows Comparative Example 2;

FIG. 3 shows Example 1; and

FIG. 4 shows Example 3.

DETAILED DESCRIPTION OF THE INVENTION

Figure 1:
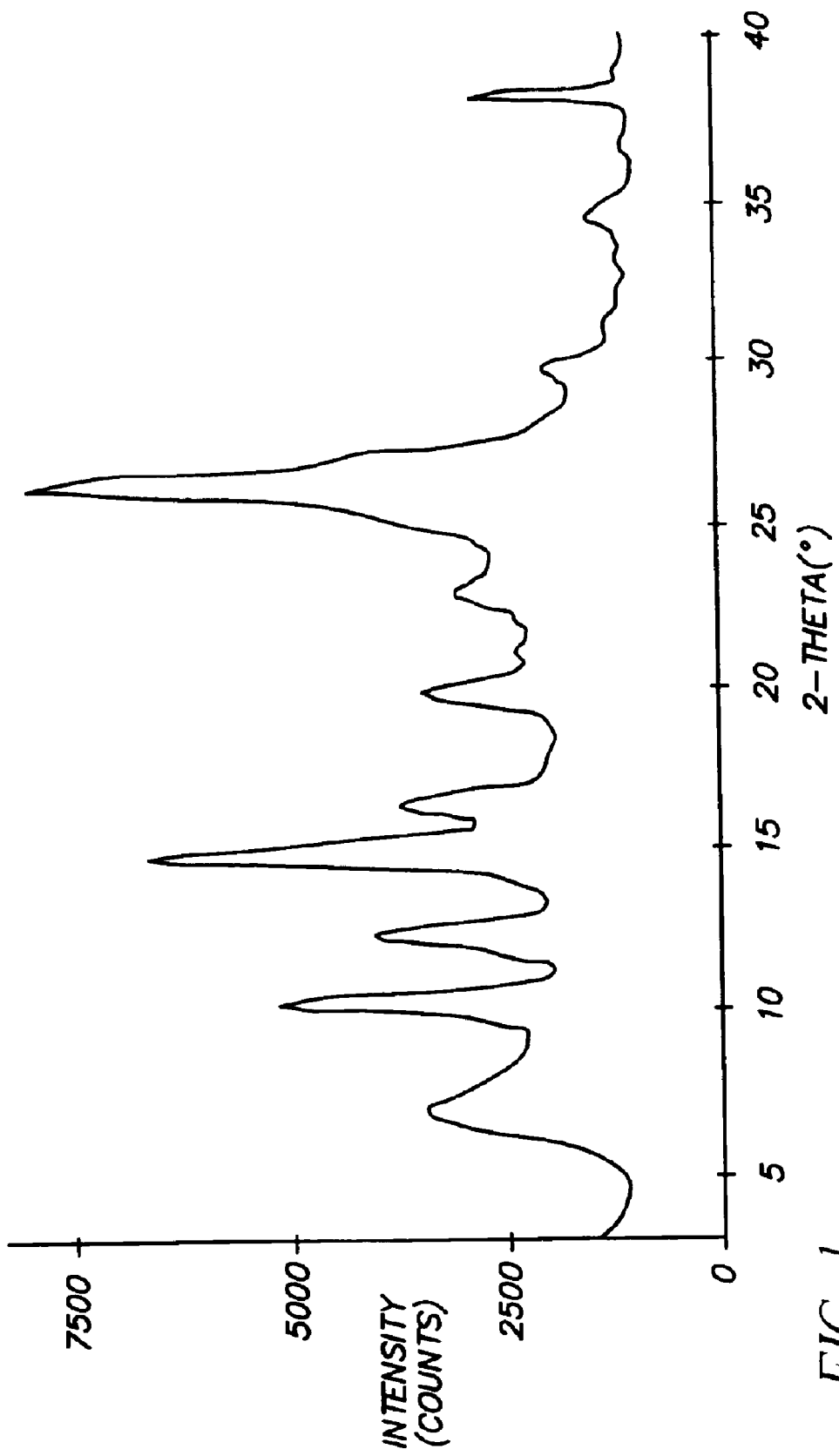
FIGS. 1–4 are X-ray diffraction spectra showing peaks of the Bragg angle 2Θ with respect to X-rays of Cu Kα at a wavelength of 1.541 Å for TiOPc and TiOFPc pigments employed in comparative examples and examples of the invention, as follows.

In the process of the present invention, it is important that the amorphization of the pigments in the first step be substantially complete to ensure the proper formation of the subsequently formed cocrystal. In particular, substantially complete amorphization of the initial pigment mixture breaks down the large particle size of the crude pigments and yields a cocrystal final product of desirably small particle size. In addition, because the original crystalline forms of the crude pigments, which frequently exhibit inherent dark decay characteristics, are resistant to solvent treatment following milling, their residual presence in the final cocrystal product will likely exert an undesirable effect on its dark decay performance.

Unsubstituted titanyl phthalocyanine, abbreviated throughout this application as "TiOPc", has the following structural formula:

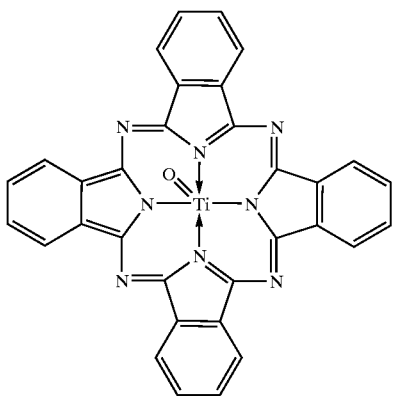

Titanyl fluorophthalocyanines, abbreviated herein as "TiFOPc", have the following structural formula:

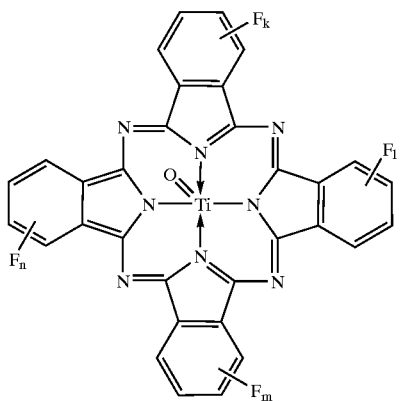

wherein each of k, l, m, and n is independently an integer from 1 to 4. In a particular embodiment of the invention, the crystalline titanyl fluorophthalocyanine is a mixture including titanyl 2,9,16,23-tetrafluorophthalocyanine, titanyl 2,9,16-trifluorophthalocyanine, titanyl 2-fluorophthalocyanine, titanyl 2,9-difluorophthalocyanine, and titanyl 2,16-difluorophthalocyanine. The composition of the mixture and their electrophotographic properties can be manipulated through varying the weight ratio of the fluorophthalocyanines. The characteristics of the phthalocyanines combined to form the crude mixture are determined by the desired photogeneration characteristics of the final product. Preferred nanoparticulate cocrystalline compositions contain about 5 to about 20 weight percent TiOFPc and about 95 to about 80 weight percent of substantially chlorine-free TiOPc.

In accordance with the process of the invention, crude titanyl phthalocyanine and titanyl fluorophthalocyanine are first admixed together. The crude materials can be synthesized by a number of well-known procedures, for example, those described in the previously discussed U.S. Pat. Nos. 4,701,396 and 5,614,342. As synthesized, titanyl phthalocyanine pigments normally have a particle size that is too large for them to be effectively used in electrophotographic applications. In this condition, they are known in the art as "crude" pigments. Such crude pigments normally have a particle size in excess of 10 micrometers, often a particle size of at least 50 micrometers, and in some cases, at least 1 millimeter. The term "particle size" is used herein to refer to the largest dimension of an individual particle and the median value of the same parameter for the particles of a particulate. Particle size can be readily determined from electron photomicrographs using techniques well known to those skilled in the art.

After admixing, the crude pigment mixture is combined with an organic milling aid, preferably an organic acid salt, and treated under conditions to render it amorphous. The crystallographic characteristics discussed herein, i.e., amorphousness and crystallinity, are based upon X-ray diffraction spectra at the Bragg angle 2Θ using Cu Kα X-radiation at a wavelength of 1.541 Å and are +/−0.2.degree unless otherwise indicated. Suitable X-ray diffraction techniques are described, for example, in *Engineering Solids,* T. S. Hutchinson and D. C. Baird, John Wiley and Sons, Inc., 1963, and *X-ray Diffraction Procedures for Polycrystalline and Amorphous Materials,* 2nd Ed., John Wiley and Sons, Inc., 1974.

Dry milling is the preferred procedure for rendering the crude pigment mixture amorphous. In dry milling, the crude pigment mixture is mechanically ground in the dry state under shear conditions that break up particle agglomerates, reduce the particle size, and render the mixture less crystalline, i.e. more amorphous. Preferably, dry milling is continued until the pigment mixture becomes substantially or fully amorphous. The term "fully amorphous", as used herein, refers to a crystalline/amorphous state in which the well defined peaks of the crude phthalocyanine are replaced by a very high baseline response modulated by a few very broad, 5–10 degree or wider peaks.

The dry milling procedure is carried out in the substantial absence of any solvent or polymeric binder. Milling apparatus capable of providing the necessary shear are well known and include, for example, conventional ball mills, roll mills, paint shakers, vibrating mills, and the apparatus described in U.S. Pat. Nos. 4,555,467 and 4,785,999. The shear employed is varied, as is well known to those skilled in the art, depending upon such factors as the type of milling apparatus, supplementary milling aids such as steel balls, and the crude pigment mixture used. The energy applied in the first milling stage generally does not exceed about 5 watts, and is typically from about 3 to 5 watts. Enough energy is applied to convert the crude pigment mixture to a low crystallinity pigment mixture.

The milling apparatus used during the dry milling stage may or may not require the use of supplementary particulate milling aids that are added to the pigment particles to increase shear and decrease milling time. Particulate milling aids suitable for use in the claimed invention are materials that can be easily removed from the milled pigment mixture. Examples of preferred supplementary particulate milling aids are steel beads and ceramic, glass, and zirconia media. These aids typically are available in sizes from about 0.5 mm to about 5 mm in diameter. Typically, the concentration of the pigment mixture during milling is from about 0.5 to 25 weight percent relative to the total weight of the pigment mixture and the milling media. The dry milling time will vary greatly depending upon a number of factors such as relative proportions of pigment mixture and milling aid and the specific milling equipment used. Generally, a suitable time for the dry milling stage may be as much as 240 hours, with typical times being in the range of from about 0.5 to 120 hours.

Milling tends to result in the liberation of heat, which would raise the temperature of the milled composition. It is desirable that the milling apparatus include temperature regulating means to help maintain the temperature below the decomposition temperature of the phthalocyanine pigments, preferably in the range of about 0° C. to about 150° C., more preferably about 40° C. to about 100° C.

In a particular embodiment of the invention, the milling is performed in a Sweco Vibro Energy grinding mill manufactured by Sweco, Inc., of Florence, Ky., stainless steel beads being added to the pigment mixture as a milling media. The pigment mixture is milled for a time period of from 12 to 96 hours at temperatures within the range of 25° C. to 60° C.

The amorphous pigment mixture is converted to a cocrystalline form by contacting with an organic solvent having a gamma$_c$ hydrogen bonding parameter value less than 9.0, or preferably less than 8.0, before the mixture comes into contact with any organic solvent having a gamma$_c$ hydrogen bonding parameter value greater than 9.0. The conversion can be carried out by wet milling the amorphous pigment in the presence of dichloromethane. Particulate milling aids such as steel beads can be used in the wet milling procedure. X-ray diffraction analysis of the pigment following removal of the milling aid and solvent confirms the cocrystalline nature of the TiOPc/TiOFPc pigment mixture.

Preparation 1—Crude Titanyl Phthalocyanine (TiOPc)

Phthalonitrile (1280 g), benzamide (1512.5 g), xylene (1250 ml), and pentanol (1052 g) were added in that order into a 12-liter 3-necked round-bottomed flask equipped with a temperature probe and temperature controller, a condenser, and a paddle stirrer. After the stirrer was started, titanium (IV) butoxide (838 g), and xylene (1000 ml) were added. The reaction mixture was heated to reflux (144° C.) for six hours, then cooled to 85° C., and filtered through a medium frit sintered glass funnel. The pigment was rinsed first with 4×500 ml portions of toluene and then with 4×500 ml portions of hot dimethylformamide. After an overnight soak in dimethylformamide, the mixture was heated at reflux in that solvent for one hour. The product was collected and washed with methanol and acetone, then dried at 70–80° C. overnight. Neutron activation indicated 8.6+/−0.02 wt % titanium and less than 0.01 wt % chlorine.

Preparation 2—Crude Titanyl Tetrafluorophthalocyanine (TiOFPc)

Crude titanyl tetrafluorophthalocyanine was prepared as described in Preparation 2 of U.S. Pat. No. 5,614,342.

The crude TiOPc and TiOFPc pigments prepared as just described were employed in the illustrative examples of the invention.

The organic milling aids of the invention are all prepared by melt phase reactions of the appropriate diacid or diester with the desired straight or branched chain alcohol or amine. A tin-containing catalyst is added to facilitate the esterification between diacid and alcohol. Transition metal (Sn, Zn, Ti) catalysts are employed to facilitate ester-interchange between a dimethyl ester and an appropriate alcohol. The amount of catalyst employed based upon reactants varies from 50 ppm up to 0.2 (w/w) % and is not removed from the resulting product. The product is allowed to cool to room temperature, broken away from the flask, and submitted for analytical assay and dispersant evaluation without further purification. The structural variants can be prepared by means of melt phase reaction techniques well known in the art, as described in, for example, Sorenson and Campbell, "Preparative Methods of Polymer Chemistry", 2nd. Ed., p. 132, Interscience Publishers, 1968.

Organic milling aids employed in the process of the present invention are preferably organic acid salts, more preferably, salts of organic sulfonic acids. Particularly preferred organic milling aids are substituted isophthalic esters and isophthalamides. Of these, isophthalic esters are preferred because they appear to be more effective at lower concentrations than the analogous isophthalamides.

Organic milling aids containing isophthalic ester and isophthalamide structures prepared according to the above-described procedures are represented by the following formula:

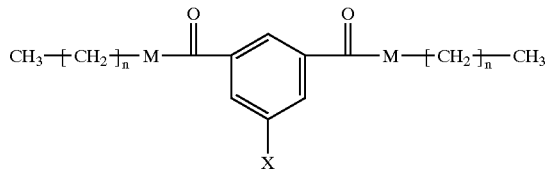

where X=H, t-Bu, OH, NO$_2$, alkyl, SO$_3$Na, SO$_3$Li, or SO$_3$P(phenyl)$_3$CH$_3$; M=NH or O; n represents an integer from 1 through 40; and, when n=0, M=OH.

Organic milling aids that comply with the foregoing structure and prepared according to the techniques described above are listed in TABLE 1 following:

TABLE 1

| Dispersant | M | n | X | Tc, ° C. | Tm, ° C. |
|---|---|---|---|---|---|
| A-1 | O | 3 | SO3Na | — | — |
| B-1 | O | 9 | SO3Na | 32.5 | 33.6 |
| C-1 | O | 11 | SO3Na | 23.2 | 25.7 |
| D-1 | O | 17 | SO3Na | 77.4 | 56 |
| E-1 | O | 11 | SO$_3$P(Ph)$_3$CH$_3$ | 35 | 22.8 |
| F-1 | O | 11 | SO$_3$Li | 25.2 | 27.9 |
| G-1 | O | 11 | t-Bu | 2.4 | 36.9 |
| H-1 | O | 11 | H | −7.1 | 21 |
| I-1 | O | 17 | OH | — | — |
| J-1 | NH | 17 | SO3Na | 32.8 | 43.5 |
| K-1 | NH | 11 | SO3Na | — | — |
| L-1 | NH | 17 | H | 104.4 | 127.9 |
| M-1 | NH | 17 | t-Bu | 21.5 | 39.4 |
| N-1 | NH | 17 | SO$_3$Li | 49.8 | 43.4 |
| O-1 | NH | 17 | SO$_3$P(Ph)$_3$CH$_3$ | — | — |

Organic milling aids containing isophthalic ester and isophthalamide structures and further characterized by inclusion of a sulfophenoxy substituent are represented by the following formula:

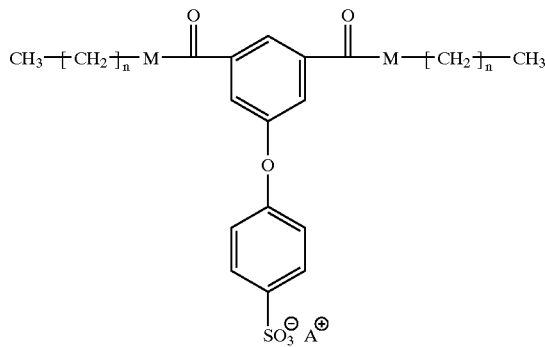

where A$^+$=Na$^+$, K$^+$, Li$^+$, or P(phenyl)$_3$CH$_3^+$; M=NH or O; and n represents an integer from 1 through 40.

Organic milling aids that comply with the foregoing structure are listed in TABLE 2 following:

TABLE 2

| Dispersant | M | A$^+$ | n | Tc, ° C. | Tm, ° C. |
|---|---|---|---|---|---|
| A-2 | O | Na+ | 7 | — | — |
| B-2 | O | Na+ | 11 | — | — |

TABLE 2-continued

| Dispersant | M | A+ | n | Tc, °C. | Tm, °C. |
|---|---|---|---|---|---|
| C-2 | O | Na+ | 17 | 42 | 53 |
| D-2 | O | Na+ | 21 | 63 | 68 |
| E-2 | NH | Na+ | 7 | — | — |
| F-2 | NH | Na+ | 17 | 31 | 42 |
| G-2 | NH | Na+ | 21 | — | — |

Organic milling aids of the present invention that contain a bis-sulfonimide structure are represented by the following formula:

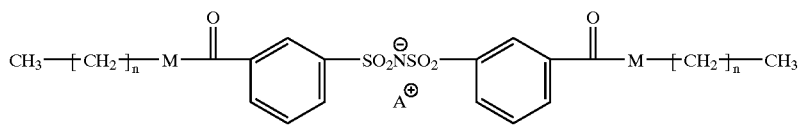

where $A^+=Na^+$, $K^+$, $Li^+$, or $P(phenyl)_3CH_3^+$; M=NH or O; and n represents an integer from 1 through 40.

Organic milling aids that comply with the foregoing structure are listed in TABLE 3 following:

TABLE 3

| Dispersant | M | A+ | n | Tc, °C. | Tm, °C. |
|---|---|---|---|---|---|
| A-3 | —O— | Na+ | 11 | 105 | 110 |
| B-3 | —O— | Na+ | 17 | 31 | 32 |
| C-3 | —O— | Na+ | 21 | — | — |
| D-3 | —O— | Na+ | 8 | — | — |
| E-3 | —NH— | Na+ | 17 | 48 | 49 |
| F-3 | —NH— | Na+ | 11 | — | — |
| G-3 | —NH— | Na+ | 7 | — | — |

Organic milling aids containing isophthalic ester and isophthalamide structures and further characterized by inclusion of an ionized disulfonimido substituent are represented by the following formula:

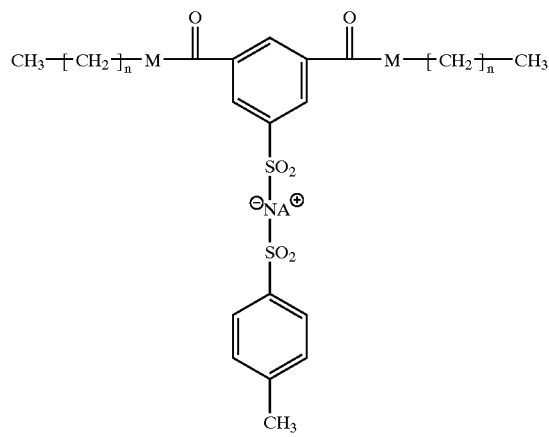

where $A^+=Na^+$, $K^+$, $Li^+$, or $P(phenyl)_3CH_3^+$; M=NH or O; and n represents an integer from 1 through 40.

Organic milling aids that comply with the foregoing structure are listed in TABLE 4 following:

TABLE 4

| Dispersant | M | A+ | n | Tc, °C. | Tm, °C. |
|---|---|---|---|---|---|
| A-4 | —NH— | K+ | 7 | — | — |
| B-4 | —NH— | K+ | 11 | — | 68 |
| C-4 | —NH— | K+ | 17 | 26 | 40 |
| D-4 | —NH— | K+ | 21 | 41 | 63 |
| E-4 | —O— | K+ | 7 | — | — |
| F-4 | —O— | K+ | 11 | — | — |
| G-4 | —O— | K+ | 17 | 31 | 42 |
| H-4 | —O— | K+ | 21 | 39 | 52 |

COMPARATIVE EXAMPLE 1

90:10 TiOPc:TiOFPc With No Added Organic Milling Aid

A 16-oz wide-mouth glass jar was charged with 900 grams of 3 mil stainless steel beads, 6.65 grams of the crude titanyl phthalocyanine of Preparation 1, and 0.75 grams of the titanyl tetrafluorophthalocyanine of Preparation 2, then placed on a Sweco mill for three days. Then 100 ml of water was introduced and the pigment milled for an additional 24 hour period. The pigment was then separated from the beads, filtered, dried, and analyzed by X-ray diffraction for amorphicity. As indicated by the result of the X-ray diffraction spectra of FIG. 1, the milled pigment is substantially crystalline.

COMPARATIVE EXAMPLE 2

88:12 TiOPc:TiOFPc with 5 wt. % Added Isophthalamide Organic Milling Aid

Figure 2:
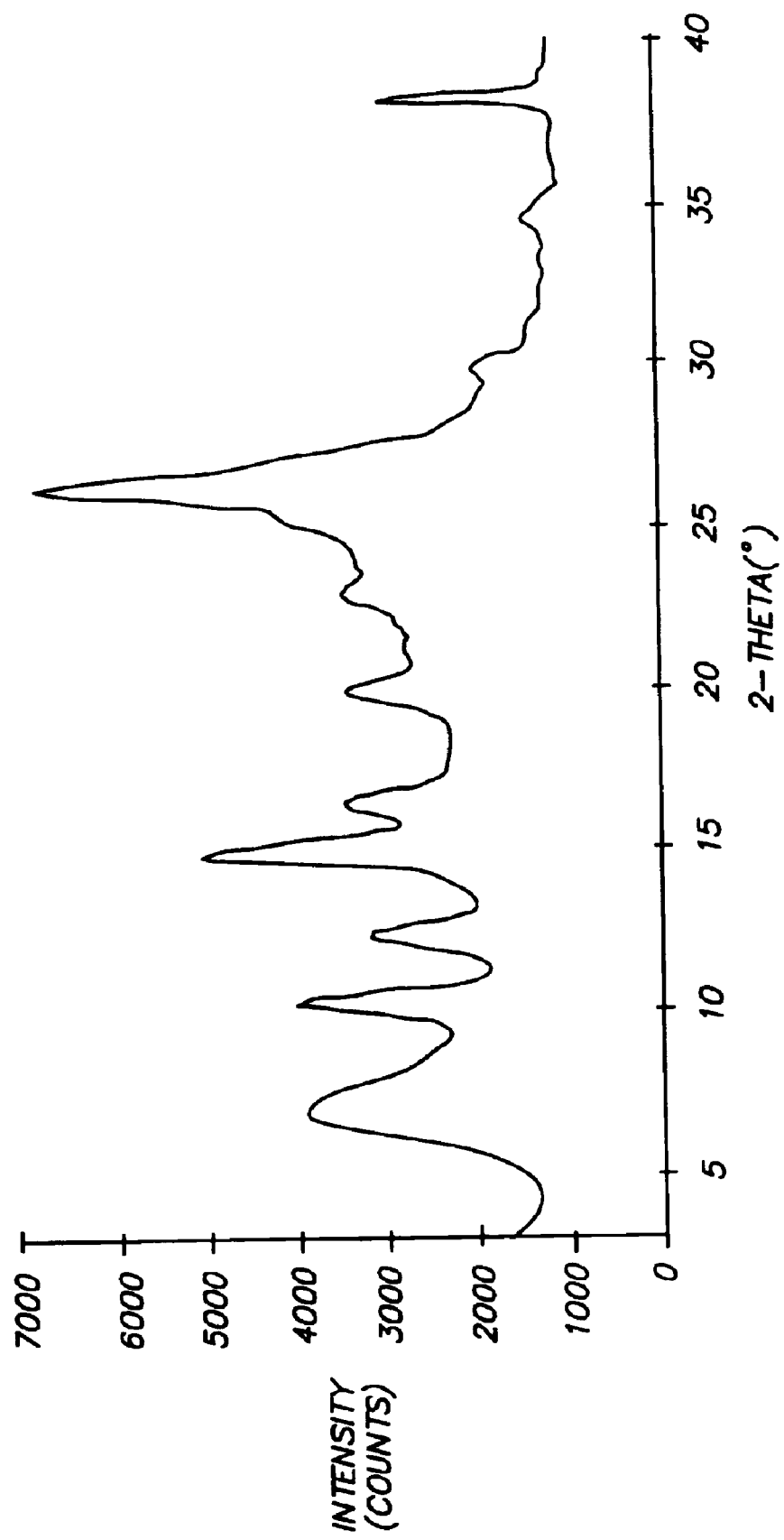

A 16 oz wide-mouth glass jar was charged with 900 grams of 3 mil stainless steel beads, 5.63 grams of the crude titanyl phthalocyanine of Preparation 1, 0.75 grams of the titanyl tetrafluorophthalocyanine of Preparation 2, and 0.38 g (5 wt %) of the isophthalamide milling aid G-2 of TABLE 2, then placed on a Sweco mill for three days. Then 100 ml of water was introduced, and the pigment was milled for an additional 24 hour period. The pigment was then separated from the beads, filtered, dried and analyzed by X-ray diffraction for amorphicity, the result being shown in FIG. 2. The similarity of FIG. 2 to FIG. 1 shows that the inclusion of 5 wt. % of the isophthalamide milling aid G-2 was insufficient to effect amorphization of the pigment.

EXAMPLE 1

88:12 TiOPc:TiOFPc With 15 wt. % Added Isophthalamide Organic Milling Aid

A 16 oz wide-mouth glass jar was charged with 900 grams of 3 mil stainless steel beads, 6.65 grams of the crude titanyl phthalocyanine of Preparation 1, 0.75 grams of the titanyl tetrafluorophthalocyanine of Preparation 2, and 0.38 gram (5 wt %) of the isophthalamide milling aid G-2 of TABLE 2, then placed on a Sweco mill for three days. Then 100 ml of water was introduced, and the pigment was milled for an additional 24 hour period. The pigment was then separated from the beads, filtered, dried and analyzed by X-ray diffraction for amorphicity.

Figure 3:
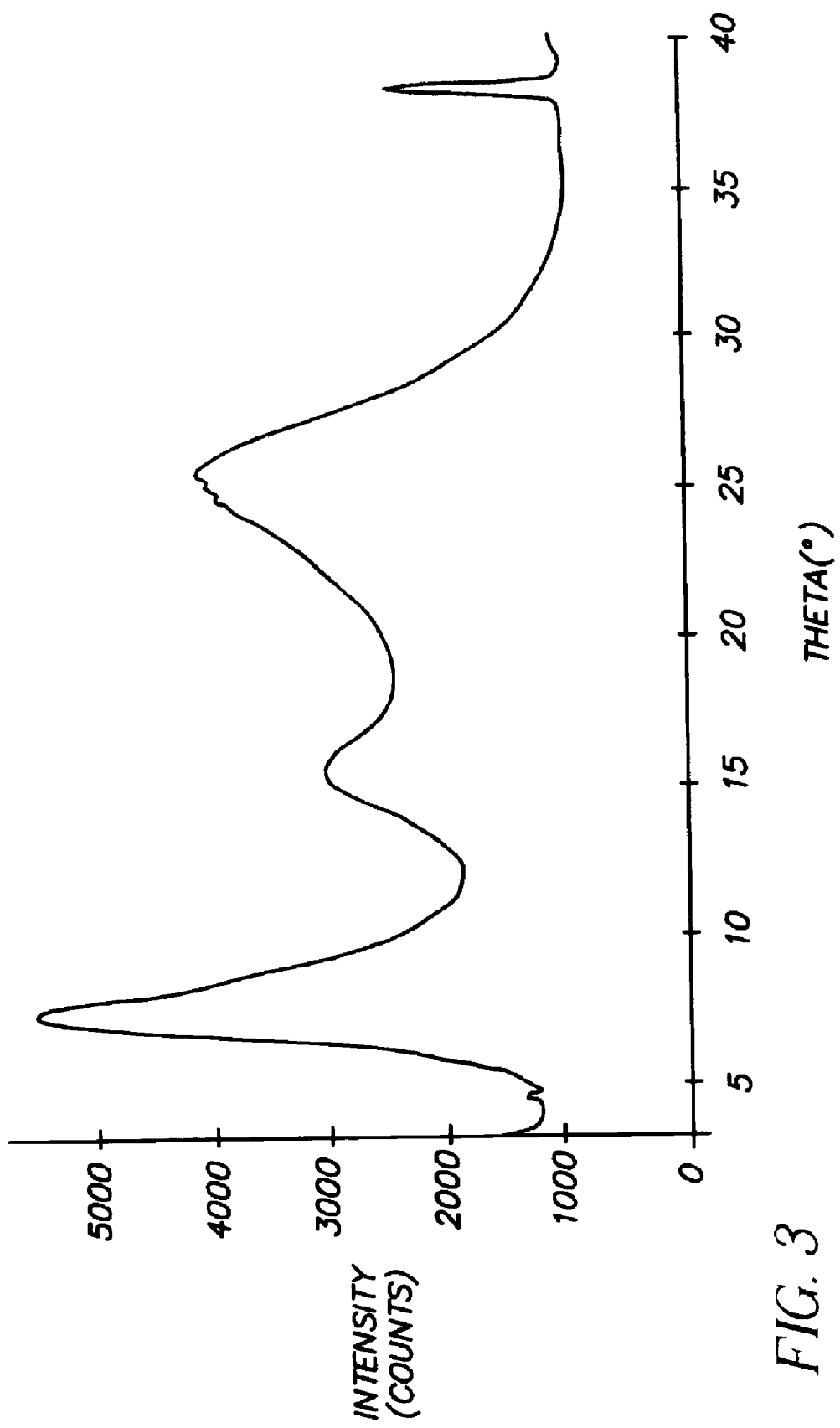

As shown by FIG. 3, use of 15 wt. % of the isophthalamide milling aid G-2 resulted in the amorphization of the pigment, in contrast with the results obtained in Comparative Example 2.

EXAMPLE 2

88:12 TiOPc:TiOFPc With 5 wt. % Added Isophthalic Ester Milling Aid

A 16 oz wide-mouth glass jar was charged with 900 grams of 3 mil stainless steel beads, 6.41 grams of the crude titanyl phthalocyanine of Preparation 1, 0.71 grams of the titanyl tetrafluorophthalocyanine of Preparation 2, and 0.38 gram (5 wt %) of the isophthalic ester milling aid A-2 of TABLE 2, then placed on a Sweco mill for three days. Then 100 ml of water were introduced, and the pigment was milled for an additional 24 hour period. The pigment was then separated from the beads, filtered, and dried. Analysis by X-ray diffraction indicated that the pigment was amorphous.

EXAMPLE 3

88:12 TiOPc:TiOFPc With 10 wt. % Added Isophthalic Ester Milling Aid

Figure 4:
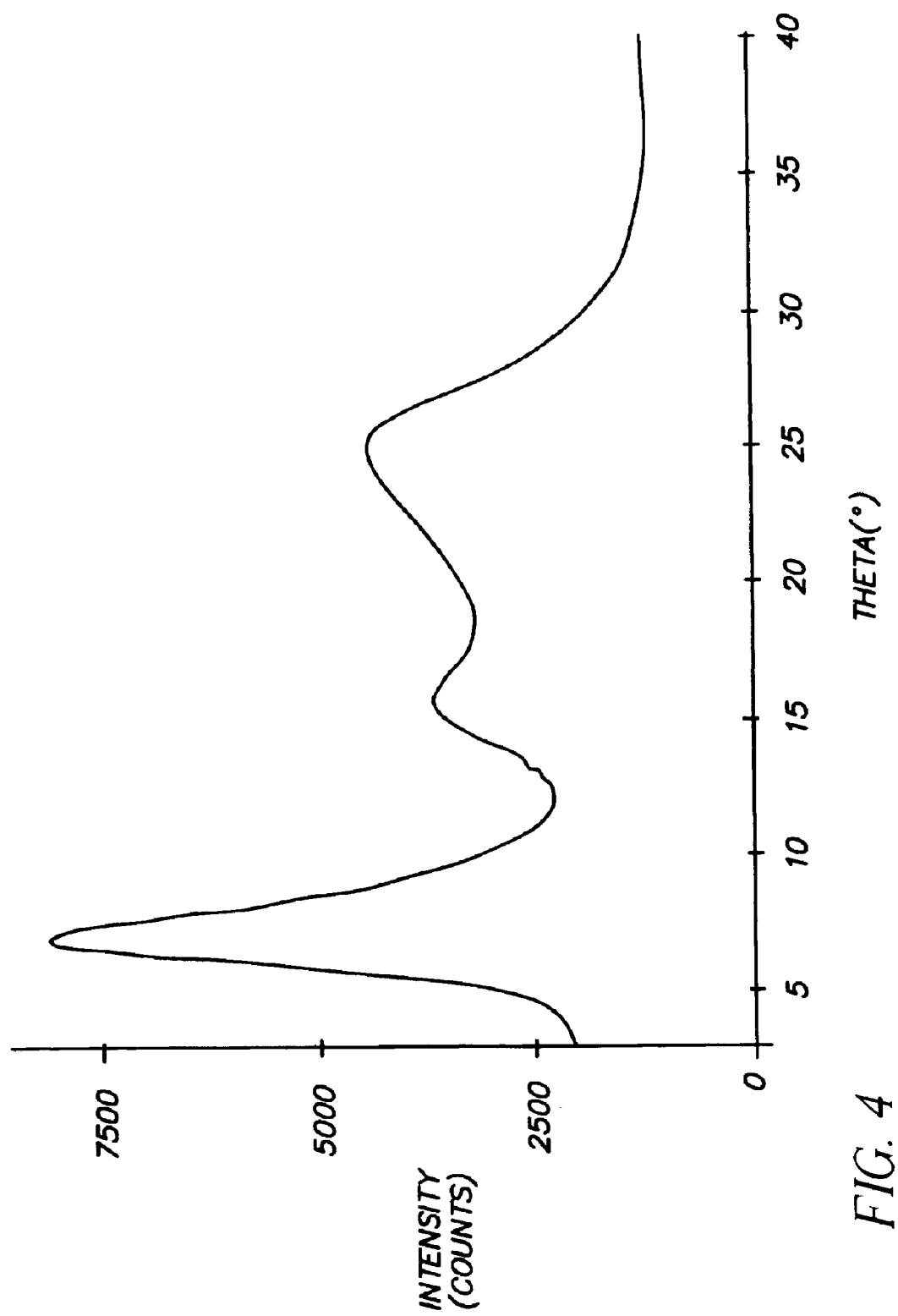

A 16 oz wide-mouth glass jar was charged with 900 grams of 3 mil stainless steel beads, 6.08 grams of the crude titanyl phthalocyanine of Preparation 1, 0.675 grams of the titanyl tetrafluorophthalocyanine of Preparation 2, and 0.75 grams (10 wt %) of the isophthalic ester milling aid A-2 of TABLE 2, then placed on a Sweco mill for three days. Then 100 ml of water was introduced, and the pigment was milled for an additional 24 hour period. The pigment was then separated from the beads, filtered, dried, and analyzed by X-ray diffraction for amorphicity. As shown by the results of the X-ray diffraction spectra of FIG. 4, the pigment was amorphous.

EXAMPLE 4

88:12 TiOPc:TiOFPc With 15 wt. % Added Isophthalic Ester Milling Aid

A 16 oz wide-mouth glass jar was charged with 900 grams of 3 mil stainless steel beads, 5.74 grams of the crude titanyl phthalocyanine of Preparation 1, 0.064 grams of the titanyl tetrafluorophthalocyanine of Preparation 2, and 1.125 grams R45(15 wt %) of the isophthalic ester milling aid A-2 of TABLE 2, then placed on a Sweco mill for three days. Then 100 ml of water was introduced, and the pigment was milled for an additional 24 hour period. The pigment was then separated from the beads, filtered, and dried. Analysis by X-ray diffraction indicated that the pigment was amorphous.

The invention has been described in detail for the purpose of illustration, but it is understood that such detail is solely for that purpose, and variations can be made therein by those skilled in the art without departing from the spirit and scope of the invention, which is defined by the following claims.

What is claimed is:

1. A process for forming an amorphous pigment mixture consisting essentially of TiOPc and TiOFPc, said process comprising:

combining a mixture of crude crystalline TiOPc and TiOFPc pigments in a weight ratio of at least 75:25 TiOPc:TiOFPc with at least about 5 wt. %, based on the total weight of TiOPc and TiOFPc, of an organic milling aid; and treating the mixture under conditions effective to form a substantially amorphous pigment mixture that consists essentially of TiOPc and TiOFPc and contains at least about 75 weight percent TiOPc.

2. The process of claim 1 further comprising:

separating said substantially amorphous pigment mixture from said organic milling aid.

3. The process of claim 1 wherein said organic milling aid comprises an organic acid salt.

4. The process of claim 1 wherein said mixture of crude crystalline TiOPc and TiOFPc is combined with at least about 10 wt. %, based on the total weight of TiOPc and TiOFPc, of said organic milling aid.

5. The process of claim 4 wherein said mixture of crude crystalline TiOPc and TiOFPc is combined with at least about 15 wt. %, based on the total weight of TiOPc and TiQFPc, of said organic milling aid.

6. The process of claim 1 wherein said conditions effective to form said substantially amorphous pigment mixture comprises dry milling.

7. The process of claim 6 wherein said dry milling is carried out using a roll mill or a ball mill.

8. The process of claim 6 wherein said dry milling is carried out using a supplementary milling aid.

9. The process of claim 8 wherein said supplementary milling aid comprises steel beads.

10. The process of claim 1 wherein said crude crystalline TiOPc pigment is substantially chlorine-free.

11. The process of claim 1 wherein said organic milling aid is represented by the formula

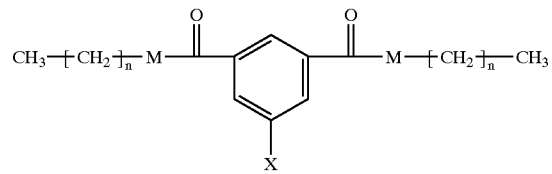

wherein X=H, t-Bu, OH, NO$_2$, alkyl, SO$_3$Na, SO$_3$Li, or SO$_3$P(phenyl)$_3$CH$_3$; M=NH or O; n represents an integer from 1 through 40; and when n=0, M=OH.

12. The process of claim 1 wherein said organic milling aid is represented by the formula

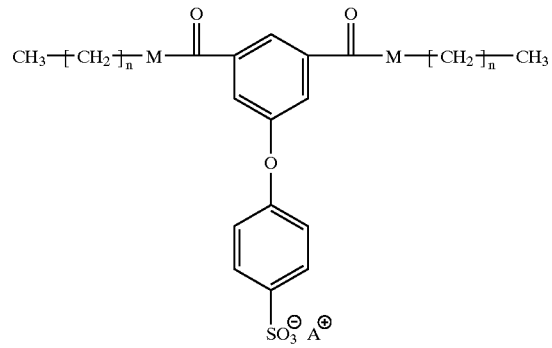

wherein A$^+$=Na$^+$, K$^+$, Li$^+$, or P(phenyl)$_3$CH$_3$$^+$; M=NH or O; and n represents an integer from 1 through 40.

13. The process of claim 12 wherein M=O.

14. The process of claim 12 wherein A$^+$=Na$^+$ and n represents an integer from 7 through 21.

15. The process of claim 1 wherein said organic milling aid is represented by the formula

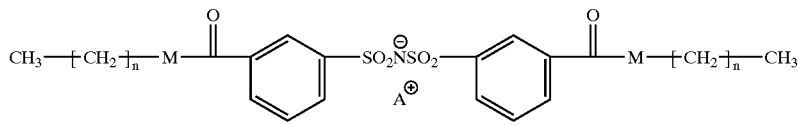

wherein $A^+ = Na^+$, $K^+$, $Li^+$, or $P(phenyl)_3CH_3^+$; M=NH or O; and n represents an integer from 1 through 40.

16. The process of claim 15 wherein M=O.

17. The process of claim 1 wherein said organic milling aid is represented by the formula

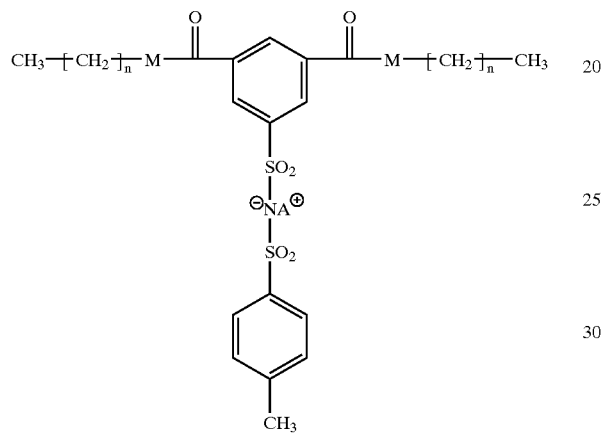

wherein $A^+ = Na^+$, $K^+$, $Li^+$, or $P(phenyl)_3CH_3^+$; M=NH or O; and n represents an integer from 1 through 40.

18. The process of claim 17 wherein M=O.

19. The process of claim 1 further comprising:
treating said substantially amorphous pigment mixture consisting essentially of TiOPc and TiOFPc and containing at least about 75 weight percent TiOPc with water; and
drying said mixture.

20. A process for forming a nanoparticulate cocrystalline composition consisting essentially of TiOFPc and TiOPc and containing at least about 75 weight percent of substantially chlorine-free TiOPc, said process comprising:
combining a mixture of crude crystalline TiOPc and TiOFPc pigments in a weight ratio of at least 75:25 TiOPc: TiOFPc with at least about 5 wt. %, based on the total weight of TiOPc and TiOFPc, of an organic milling aid;
treating the mixture under conditions effective to form a substantially amorphous pigment mixture consisting essentially of TiOPc and TiOFPc and containing at least about 75 weight percent TiOPc;
forming a slurry in an organic solvent of said substantially amorphous pigment mixture of TiOFPc and TiOPc; and
wet milling said slurry, thereby forming a a nanoparticulate cocrystalline composition consisting essentially of TiOFPc and TiOPc and containing at least about 75 weight percent of TiOPc.

21. The process of claim 20 wherein said organic solvent is dichloromethane.

22. The process of claim 20 wherein said wet milling is carried out using a supplementary milling aid.

23. The process of claim 22 wherein said supplementary milling aid comprises steel beads.

24. The process of claim 20 wherein said nanoparticulate cocrystalline composition consists essentially of about 5 weight percent TiOFPc and about 95 weight percent of substantially chlorine-free TiOPc.

25. The process of claim 20 wherein said nanoparticulate cocrystalline composition consists essentially of about 10 weight percent TiOFPc and about 90 weight percent of substantially chlorine-free TiOPc.

26. The process of claim 20 wherein said nanoparticulate cocrystalline composition consists essentially of about 12 weight percent TiOFPc and about 88 weight percent of substantially chlorine-free TiOPc.

27. The process of claim 20 wherein said nanoparticulate cocrystalline composition consists essentially of about 20 weight percent TiOFPc and about 80 weight percent of substantially chlorine-free TiOPc.

* * * * *